United States Patent [19]

Watson

[11] Patent Number: 4,711,624
[45] Date of Patent: Dec. 8, 1987

[54] APPARATUS FOR HEAT-SETTING A TUBULAR ARTICLE OF CRYSTALLIZABLE POLYMER

[75] Inventor: Martin J. Watson, Wantage, England
[73] Assignee: Metal Box p.l.c., Reading, England
[21] Appl. No.: 837,533
[22] Filed: Mar. 7, 1986
[30] Foreign Application Priority Data Mar. 18, 1985 [GB] United Kingdom ............... 8506932

[51] Int. Cl.[4] .......................................... B29C 55/22
[52] U.S. Cl. .................... 425/384; 264/523; 425/387.1; 425/393; 425/526
[58] Field of Search ............... 264/523, 535, 571, 573, 264/292, 528; 425/143, 144, 182, 185, 188, 500, 501, 502, 503, 504, 507, 509, 522, 526, 383, 384, 385, 389, 390, 392, 393, 407, 14, 40, 42, 44, 394

[56] References Cited

U.S. PATENT DOCUMENTS

| | | | |
|---|---|---|---|
| 3,182,355 | 5/1965 | Arnaudin, Jr. | 425/384 |
| 4,005,968 | 2/1977 | Crawford | 425/384 |
| 4,155,694 | 5/1979 | Savioli | 425/393 |
| 4,277,231 | 7/1981 | Gordon | 425/387.1 |
| 4,405,546 | 9/1983 | Jakobsen et al. | 425/393 |
| 4,511,322 | 4/1985 | Jakobsen et al. | 425/387.1 |
| 4,518,340 | 5/1985 | Jakobsen et al. | 425/384 |
| 4,545,951 | 10/1985 | Gordon | 425/387.1 |

FOREIGN PATENT DOCUMENTS

| | | |
|---|---|---|
| 81451 | 6/1983 | European Pat. Off. . |
| 2089276 | 6/1982 | United Kingdom . |
| 2138349 | 10/1984 | United Kingdom . |

Primary Examiner—Jay H. Woo
Assistant Examiner—J. Fortenberry
Attorney, Agent, or Firm—St.Onge Steward Johnston & Reens

[57] ABSTRACT

For making open-ended thermoplastic tubular articles, which are dimensionally stable up to elevated temperatures, an open-ended polymer tube is placed between a fixed, heated external mould and a cooled mandrel, which is vertically displaceable relative to the mould, both the ends of the polymer tube being clamped to restrain the tube axially. The polymer tube is radially expanded into contact with the hot mould and maintained in contact for a time sufficient to ensure dimensional stability, and then allowed to shrink back into contact with the cooled mandrel, which is maintained at a temperature below the glass transistion temperature of the polymer. The resulting article is then stripped from the mandrel.

11 Claims, 10 Drawing Figures

APPARATUS FOR HEAT-SETTING A TUBULAR ARTICLE OF CRYSTALLIZABLE POLYMER

BACKGROUND OF THE INVENTION

1. Field of the Invention

The present invention relates to apparatus and methods for making thermoplastic tubular articles, which are open at both ends, which are dimensionally stable up to a specific elevated temperature and which are made from crystallizable polymers, and to the articles made thereby, particularly tubular bodies of saturated linear polyester materials such as polyethylene terephthalate, which are intended for processable food and beverage containers.

2. Description of the Prior Art

While biaxial drawing of a thermoplastic saturated linear polyester material, such as polyethylene terephthalate, improves its mechanical properties by inducing a degree of biaxial orientation, the material will, however, shrink if heated above the temperature at which it was drawn. It is known that this tendency of biaxially drawn polyester sheet material to shrink can be reduced by heat-setting the material. Methods and apparatus for forming biaxially oriented tubular articles, which are heat-shrink resistant and which may therefore be used as bodies for processable food containers, are disclosed in our co-pending UK Patent No. 8037137 (Publication No. 2089276A) and UK Patent Application No. 8310966. The second of these applications is specifically concerned with heat-treating an open-ended body, but the apparatus suffers the disadvantage of thermal cycling of certain components, with the result that energy is wasted.

European Patent Application No. 82630109.5 (Publication No. 0081451) filed by the Goodyear Tire and Rubber Company is concerned with a process and apparatus where the formation, by plug-forming, and heat-treatment of PET tube are combined. In contrast, in the present invention the heat-treatment is separate from the forming step, with the result that open-ended tubular articles can be produced.

SUMMARY OF THE INVENTION

According to a first aspect of the present invention, apparatus for making a thermoplastic tubular article of a crystallizable polymer, which is open at both ends and which will be dimensionally stable up to a specific elevated temperature, comprises a mandrel, cooling means for cooling the mandrel to a temperature below the glass transition temperature of the tubular article, a mould having a cavity of complementary shape to that of the mandrel and adapted to surround the mandrel with a small clearance between the mandrel and mould, heating means for heating the mould to a temperature higher than said specific elevated temperature, clamping means for clamping portions adjacent each end of an at least partly biaxially oriented polymer tube disposed between the mandrel and mould, thereby axially restraining said tube, and expansion means for elastically expanding the polymer tube into contact with the mould.

In order that the polymer tube may be introduced easily between the mandrel and mould, preferably the mandrel and mould are movable axially relative to one another.

For further ease in introducing the PET between mould and mandrel, suitably the mould is additionally pivotable relative to the mandrel.

The apparatus may further comprise means for applying a vacuum to the mould cavity. This alone could provide the expansion means for axially expanding the polymer tube by sucking it into contact with the mould, but in any case it would avoid air entrapment between the polymer tube and mould during tube expansion.

Alternatively, the mandrel is hollow and has perforations in its surface, the expansion means comprising a conduit for supplying pressurised fluid to the interior of the mandrel. This expansion means can be used alone or in conjunction with the vacuum to expand the polymer tube into contact with the mould.

The mould may comprise a mould wall which is made of an air-permeable material, such as sintered bronze, to minimise air entrapment between the expanding PET tube and the mould wall. Such a mould may be used satisfactorily in conjunction with the embodiment in which the PET tube is expanded solely by or with the aid of a vacuum applied between the PET tube and mould wall.

The clamping means may comprise, adjacent each end of the mandrel, an inatable toroid of a resilient material, such as rubber, adapted to co-operate when inflated, with respective surfaces on the mould to clamp said portions of the tube adjacent its ends between each toroid and the respective surface on the mould.

An alternative clamping means comprises a pair of split-ring clamps, each having a fixed half-ring and a movable half-ring reciprocable relative to the fixed half-ring, whereby the polymer tube end portions can be squeezed between each clamp and the mandrel.

The cooling means may comprise, where the mandrel is hollow, a helical conduit of a material of high thermal conductivity in thermal contact with the internal surface of the hollow mandrel, the conduit being served by supply and return means for cooling fluid, such as tap water.

The heating means for the mould may comprise band heaters wrapped around the external surface of the mould.

According to a second aspect of the present invention, there is provided a method of making a thermoplastic tubular article, which is open at both ends and which will be dimensionally stable up to a specific elevated temperature, comprising the steps of disposing an at least partly biaxially oriented polymer tube, open at both ends and made of a crystallizable polymer, between a cooled mandrel and a heated mould, so that the mandrel is inside the tube and the mould surrounds and is spaced from the tube, the mould being heated to a temperature higher than said specific elevated temperature and the mandrel being maintained at a temperature below the glass transition temperature of the polymer, clamping portions of the tube adjacent both its ends so that the tube is axially restrained, elastically expanding the tube into contact with the mould, maintaining the tube in contact with the mould for a time sufficient to ensure the required degree of dimensional stability, allowing the tube to shrink back into contact with the mandrel which restrains the tube from further radial shrinkage, the tube remaining in contact with the mandrel until its temperature falls to below said glass transition temperature, and then releasing contact between the tubular article and mandrel to enable them to be separated.

For tubular articles made of polyethylene terephthalate which are to be used as container bodies for food or beverages, which bodies may be subjected to elevated temperatures for processing the contents, the heat-setting temperature at which the mould is suitably maintained is a temperature in the range of from 150° C. to 230° C. The mandrel is cooled to a temperature suitably below 80° C., by a cooling fluid such as tap water.

Preferably the polymer tube is urged into contact with the mould at a pressure of at least 3.4 bars.

DETAILED DESCRIPTION OF THE PREFERRED EMBODIMENTS

The illustrated embodiments of the invention are particularly, but not exclusively, concerned with the production of tubular bodies made of polyethylene terephthalate (PET) for thermally processable food containers which have end closures seamed to the ends of the body. The tubular bodies, open at both ends, are made from tubes of at least partly biaxially oriented PET which may be produced by the process disclosed in our prior British Patent application No. 8037137 (publication No. 2089276A). In order that the containers will be able to withstand hot-filling, pasteurisation or sterilisation processes at temperatures of from 60° C. to 120° C. without unacceptable shrinkage, it is necessary to carry out a heat-setting treatment on the oriented PET tube. The container bodies must have sufficient dimensional stability in order that the end closures may be matched precisely to give gas-tight seams and in order that the seams are not over-stressed through subsequent shrinkage. These requirements are particularly important when the containers are for food or beverages, as the risk of contamination through damaged seams must be substantially eliminated.

Figure 1:
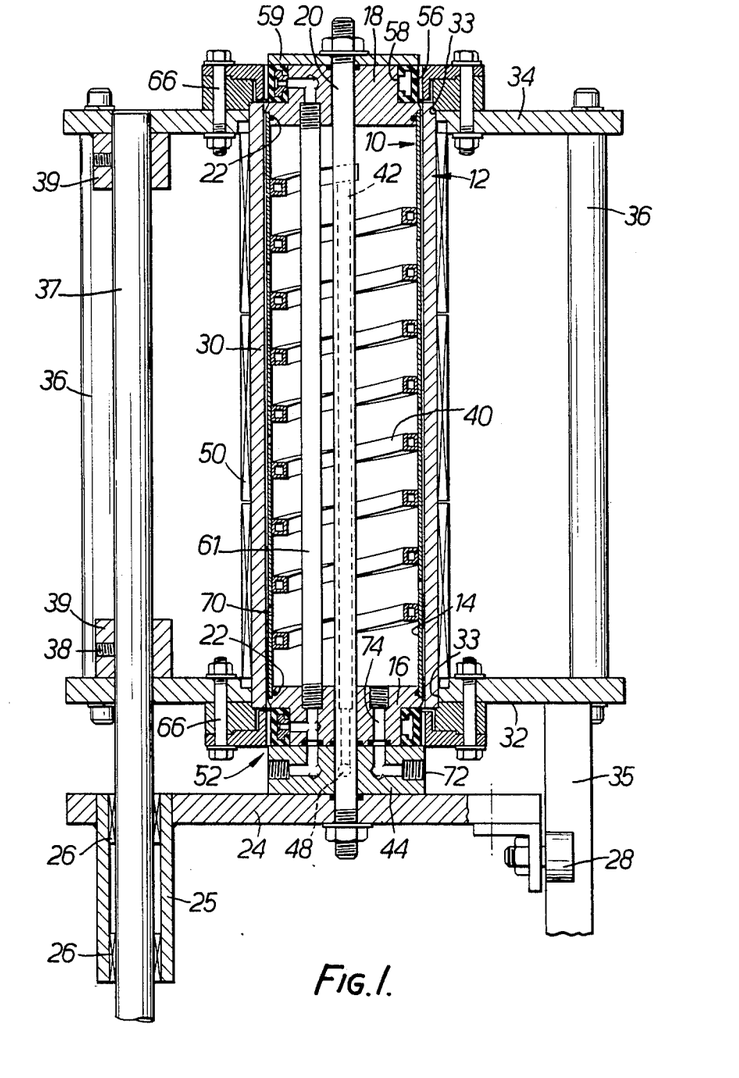
FIG. 1 is a vertical section through a first embodiment of apparatus in accordance with the invention.

Referring to FIG. 1 of the drawings, there is shown an apparatus for carrying out the heat-setting process on PET tube. The apparatus generally comprises a fixed external mould 12 adapted to receive therein a mandrel 10 mounted for axial movement relative to the mould 12 in a vertical direction.

In the illustrated embodiments, the mandrel 10 comprises a hollow, cylindrical mandrel body 14 closed at each end by respective end blocks 16, 18. The end blocks 16,18 are held in the ends of the mandrel body 14 by means of a central, axially extending bolt 20. O-rings 22 disposed between the end blocks and the respective end portions of the mandrel body ensure an air-tight seal. The mandrel 10 is mounted on a support bracket 24 by means of the central bolt 20, and this support bracket 24 (FIGS. 1 and 2) is provided with a sleeve 25, housing a pair of spaced bearings 26 and with a roller 28.

Figure 4:
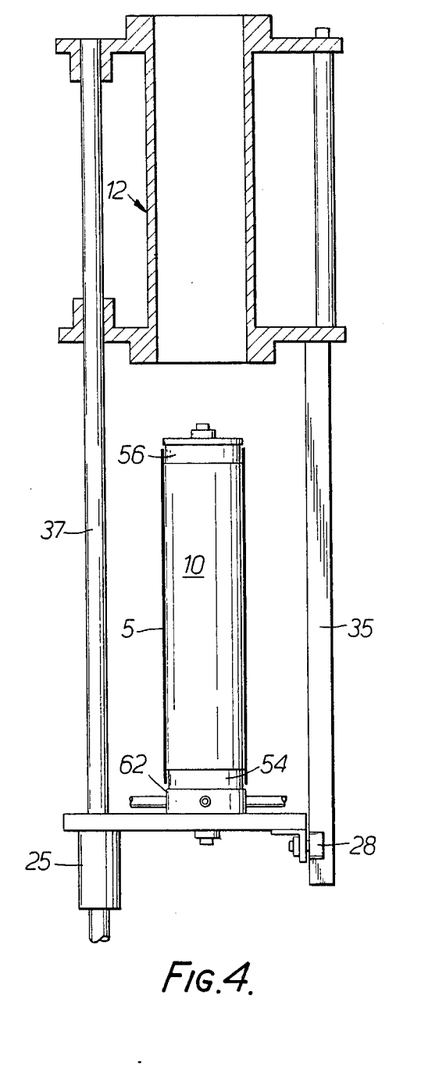
FIGS. 4 to 7 illustrate various steps of the method according to the invention, using the apparatus of FIGS. 1 to 3 viewed in vertical section for FIGS. 4, 6 and 7 and from below for FIG. 5.

The mandrel 10 is slidably mounted for axial movement relative to the mould 12, so that it can be received in the mould, as shown in FIG. 1, or retracted therefrom (FIG. 4). The mould 12 comprises a mould wall 30, which, in this instance, is cylindrical and is of a diameter only slightly larger than that of the mandrel body 14. The mould wall 30 can be made of sintered bronze, which renders the wall air-permeable. The clearance between the mandrel body 14 and the mould wall 30 is important and will be discussed in greater detail below.

The mould 12 further comprises a cage-like structure (FIGS. 1 and 2) which supports the mould wall 30 and on which the mandrel 10 is mounted for both axial displacement and swinging movement relative to the mould 12. This structure comprises a lower plate 32 an an upper plate 34, each having a substantially centrally disposed aperture 33 in which is located a respective end portion of the mould wall 30, the plates 32, 34 being rigidly interconnected adjacent their corners by four struts 36, which hold the plates at a fixed spacing. A vertical bearing shaft 37 extends between the plates, projects beyond the lower plate 32, and is held by grub screws 38 in a pair of collars 39, fastened one each to the plates 32, 34. On the projecting end of the rod 37 is slidably and rotatably mounted the pair of bearings 26 which is supported in sleeve 25 on bracket 24 connected to the mandrel 10. Secured to and projecting from the external face of the lower plate 32 is an L-section guide bar 35. The mandrel 10 is guided during its axial movement relative to the mould 12 by the sleeve 25 sliding on the rod 37 and by the stop roller 28 cooperating in rolling contact with the guide bar 35.

The mandrel body 14 and the mould wall 30 are respectively provided with cooling means 40 and heating means 50 so that, during use of the apparatus, the mould wall 30 can be maintained at a predetermined elevated temperature, whilst the mandrel body 14 will be maintained at a temperature below the glass transition temperature of the polymer. The cooling means 40 comprises a helical copper conduit, of square cross-section, brazed to the internal surface of the hollow mandrel body14. Cooling fluid, such as tap water, is supplied to and returned from the conduit 40 respectively by means of an inlet pipe (not shown) and an outlet pipe 42 housed within the hollow mandrel body 14 and both opening into the end block 16 of the mandrel. A disc 44 is mounted on the central bolt 20 between the end block 16 and the support bracket 24 and contains an inlet port 46 and an outlet port 48 respectively communicating with the inlet and outlet pipes for the cooling fluid.

The heating means 50 for the mould wall 30 comprises three conventional band heaters wrapped around the mould wall and thermostatically controlled to maintain the mould wall at said predetermined elevated temperature.

Figure 3:
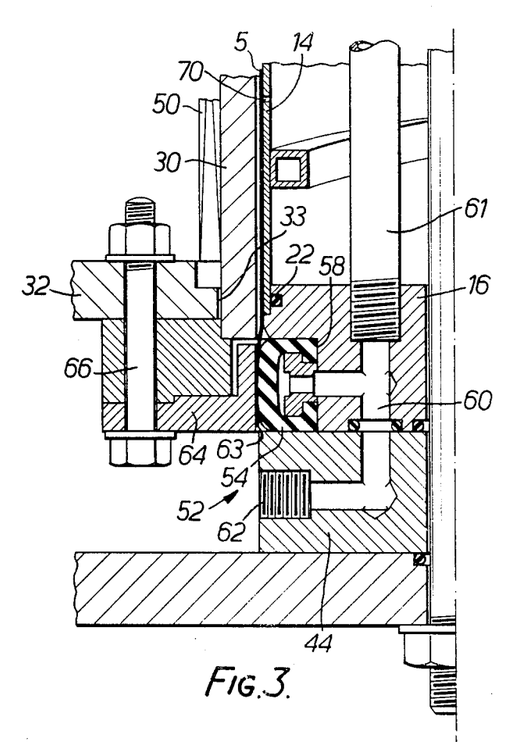
FIG. 3 shows part of the apparatus of FIG. 1 on an enlarged scale.

Referring to FIG. 3 of the drawings, there is shown in greater detail one form of clamping means 52 for the apparatus. In use of the apparatus, a PET tube 5, open at both its ends, is introduced between the mandrel body 14 and mould wall 30 as will be explained below. In order to prevent the PET tube 5 shrinking axially during the heat-setting process, the ends of the tube 5 must be axially restrained. This is achieved by clamping the tube at both its ends and, in this instance, the clamping means 52 comprises, for each end of the PET tube, an inflatable tire 54, 56 of a resilient material, such as rubber, located one in each of the end blocks 16, 18. Each tire 54, 56 has the form of a hollow toroid open along its inner circumference towards a wall 58 formed by the circumference of a portion of reduced cross-section of the end block 16, 18 which houses the tire. The tire 52 is held laterally in the end block 16 by the disc 44, while tire 54 is held in the end block 18 by a washer 59 captive on the central bolt 20. Both the tires 54, 56 are supplied with compressed air through a supply bore 60 which passes through the end block 16 and communicates with a compressed air inlet port 62 in the disc 44 of the mandrel 10.

The bore 60 supplies the tire 54 directly and branches to a longitudinal pipe 61 extending through the hollow mandrel body 14 for supplying air to the other tire 56. Thus, a pressurised fluid, such as compressed air, supplied to the air inlet port will cause both tires to inflate substantially simultaneously. Facing the external circumference of each tire is a circular internal surface 63 of a respective collar 64 bolted at 66 to each of the upper and lower plates 32, 34 of the cage for the mould 12. As the tires inflate, they urge an end portion of the PET tube 5 into contact with the respective opposing surface 63 of the collar 64 on the mould 12. The tube 5 is thereby clamped at both of its ends. A suitable material for the tires is silicon rubber as it presents low friction to the tubular article when it is finally stripped from the mandrel 10.

The mandrel body 14 is provided with a plurality of axially and circumferentially spaced perforations 70. The cavity within the hollow mandrel body 14 is adapted to be supplied with compressed air through a port 72 in the disc 44, which port communicates with a bore 74 in the end block 16. Air supplied to the interior of the mandrel body will pass out through the perforations 70 to form an air cushion between the mandrel and the PET tube. This air bearing provided by the air escaping through perforations 70 in the mandrel body 14 performs two functions. Firstly, it enables a PET tube 5 to be expanded elastically into contact with the heated mould 12 for the heat-setting process to take place while the PET tube is in contact with the mould wall 30. Secondly, it enables the tubular article to be stripped from the mandrel body 14 after it has been formed.

Not shown in the drawings is a vacuum line which provides a vacuum between the mould wall 30 and a PET tube 5 positioned between the mandrel and mould. By applying a vacuum between the mould wall and PET tube, air entrapment during expansion of the PET tube is prevented, ensuring good contact between the PET tube and mould wall 30.

In an alternative embodiment (not illustrated) the mandrel body 14 is not provided with perforations 70 or a compressed air supply to its interior and the expansion of the PET tube is achieved solely by means of the vacuum applied between the PET tube and the mould wall 30.

The clearance between the mandrel body 14 and mould wall 30 has already been referred to. More particularly, the radial clearance between the mandrel body 14 and the mould wall 30 should accommodate the thickness of the PET tube 5 with the remaining radial clearance between PET tube and mould wall 30 being within the elastic limit of the PET tube, so that expansion of the PET tube 5 into contact with the mould wall 30 is entirely elastic, and plastic deformation of the PET tube during expansion is avoided. To give an example of the approximate clearance between mandrel and mould, for a PET tube having a radial thickness of 0.425 mm the radial clearance between mandrel body 14 and internal surface of mould wall 30 would be 0.9 mm, i.e. 0.475 mm radial clearance between the PET tube once slipped onto the mandrel. This is within the elastic limit of the PET tube.

Figure 2:
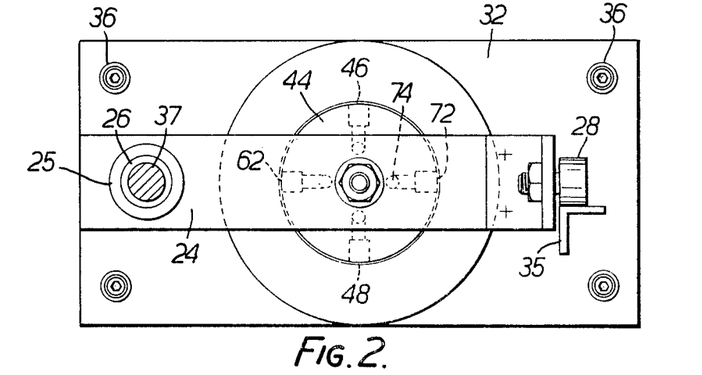
FIG. 2 shows the apparatus of FIG. 1 viewed from below.
Figure 5:
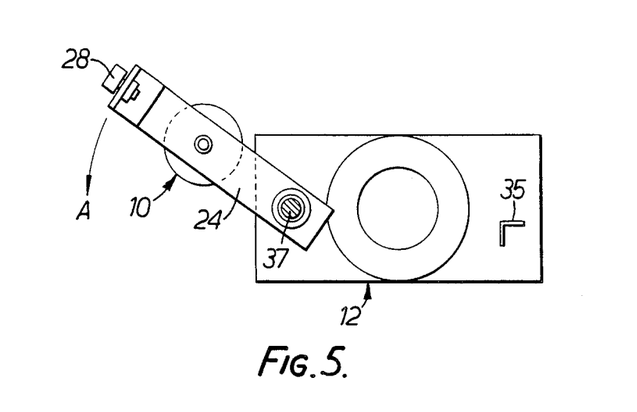
Figure 6:
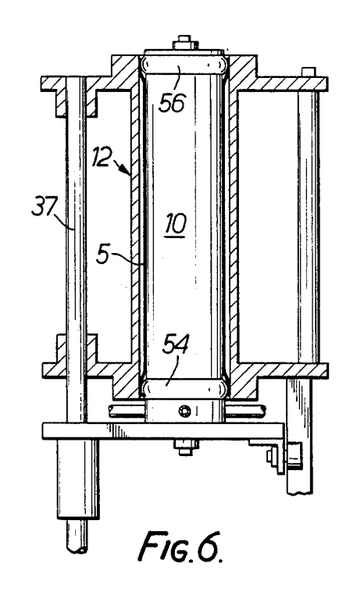

The operation of the apparatus illustrated in FIGS. 1 to 3 is now described, with reference to FIGS. 4 to 7 of the drawings. Initially, as shown in FIG. 4, the mandrel 10 is retracted to a position below the mould 12 (FIG. 4), by the sleeve 25 sliding down the rod 37 and the stop roller 28 rolling along the guide bar 35. Once the mandrel 10 is retracted, it is swung out of the way by pivoting it sideways about the rod 37 (FIG. 5), and a PET tube 5 to be heat-treated is slipped over the mandrel 10, the PET tube having a radius only just greater than that of the mandrel 10. The mandrel 10 is then swung back into alignment with the mould and moved axially up into the mould 12 until the mandrel 10 and PET tube 5 are received within the mould cavity. Compressed air is then supplied to the port 62 in disc 44 to inflate the tires 54 and 56, thereby clamping the PET tube 5 against the mould 12 by means of the tires 54, 56 of the mandrel 10 (FIGS. 3 and 6). The PET tube 5 is thereby restrained axially against subsequent shrinkage during the heat-setting process.

Figure 7:
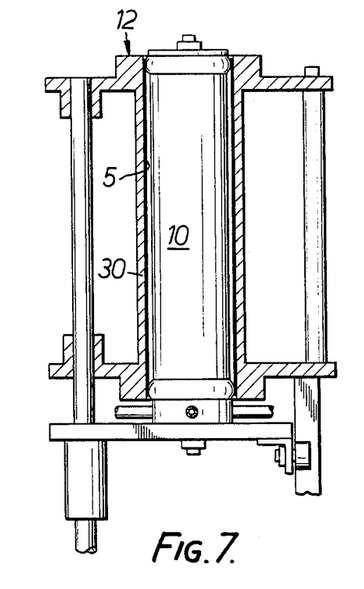

Compressed air is now supplied to the interior of the mandrel and passes through perforations 70 to expand the PET tube elastically into contact with the mould wall 30 (FIG. 7). Air entrapment between the expanding PET tube 5 and the mould wall 30 is avoided by providing an at least partial vacuum between the PET tube 5 and mould wall (as referred to above) and/or by any residual air escaping into the voids within the sintered bronze material of the mould wall 30. The pressure is maintained within the hollow mandrel, to hold the PET tube 5 in contact with the mould wall 30 for sufficient time to ensure the required degree of heat-setting. The air pressure is then released from the interior of the mandrel and, due to residual shrinkage of the PET tube, the tube 5 shrinks back onto the mandrel 10. It is the mandrel which restrains the PET tube from further radial shrinkage.

The tube 5 is left in contact with the mandrel until its temperature is reduced to below the glass transition temperature of the polymer material of the tube 5. The tires 54, 56 are then allowed to deflate, releasing the clamp on the PET tube. The mandrel 10 is then retracted from the mould 12 back into the position of FIG. 4, and swung out of the way as shown in FIG. 5. The tubular article thus formed is then stripped from the mandrel 10 by introducing compressed air once more into of the mandrel, the air passing out through the mandrel's perforations 70 to separate the tubular article from the mandrel.

The process described above is repeated for each tubular article which is to be formed, but, throughout, the mould 12 is maintained at the desired temperature for performing the heat-treatment by operation of the band heaters 50, whilst the mandrel 10 is permanently cooled. Thus thermal cycling of the components is avoided, so that the heat-treatment is carried out rapidly and there is minimal energy wasted. For PET, the mould wall 30 is maintained at a heat-setting temperature of up to 230° C. and, with the mould wall at this temperature, the heat-setting period during which the tube 5 must be held in contact with the mould wall 30 is of the order of 5 seconds. This is a rapid heat-treatment compared with prior art process. The mandrel is positively cooled, typically to below 80° C. In order to obtain good thermal contact between the PET tube 5 and the mould wall 30 during heat-setting, the pressure urging tube 5 into contact should be at least 3.4 bars. This will be the resultant pressure of the internal pressure supplied from the hollow mandrel and the vacuum applied between the mould wall 30 and the PET tube.

EXAMPLE

The following heat-treatment programmes have been carried out and resulted in the given percentage shrinkages:

| Mould Temperature | Expansion pressure | Mould contact Time | % Shrinkage at 120° C. | |
|---|---|---|---|---|
| | | | Axial | Hoop |
| 190° C. (±5° C.) | 4.83 bars | 10 secs | 4 | 5 |
| | | 20 secs | 4 | 4 |
| | | 30 secs | 3 | 4 |

In conclusion, from the given Example, it can be seen that the longer the PET tube is in contact with the hot mould, the greater the heat stability of the resultant tubular article, or, put another way, the longer the contact time, the less the residual shrinkage experienced during a subsequent treatment, such as pasteurisation or sterilisation, to which the article is subjected.

In an alternative embodiment, the mandrel does not swing relative to the mould when introducing a PET tube 5 onto the mandrel or stripping the tubular article therefrom. Instead, the mandrel remains axially aligned therewith but is retracted to a position further from the mould than is shown in FIG. 4 to a position where the tube 5 can be introduced into a position in axial alignment with, and positioned between, the mandrel and mould. The mandrel is then advanced towards the mould until it is inserted with the polymer tube 5, and further advancement of the mandrel carries the PET tube into the mould. The formed tubular article is removed by the mandrel withdrawing from the mould and carrying the tubular article with it, which article then being air stripped from the mandrel.

Figure 8:
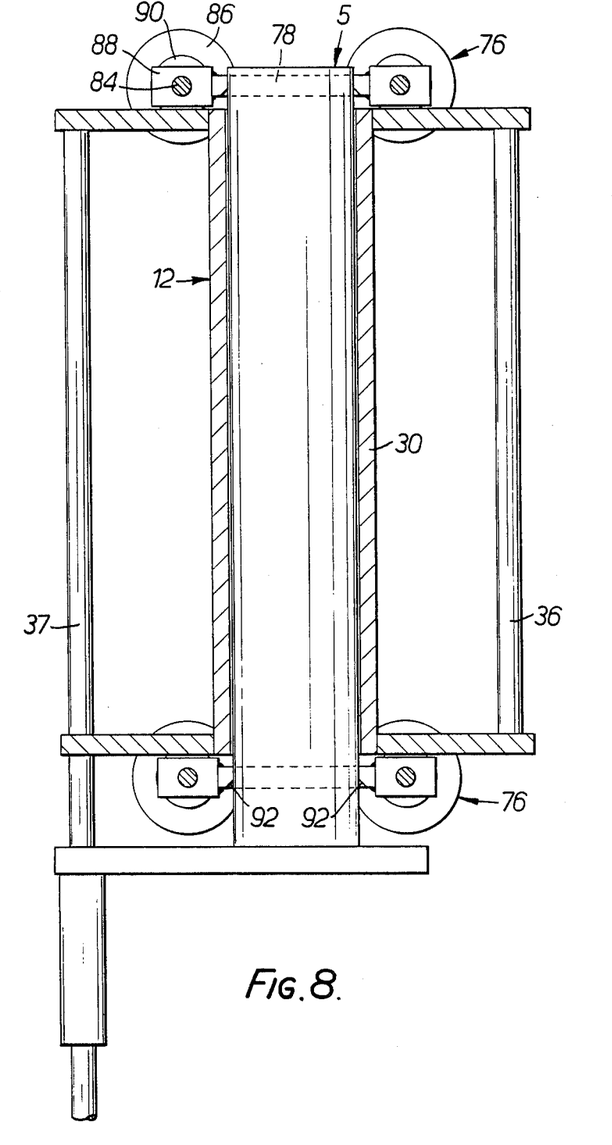
FIGS. 8 to 10 illustrate an alternative clamping means for the apparatus according to the invention.
Figure 9:
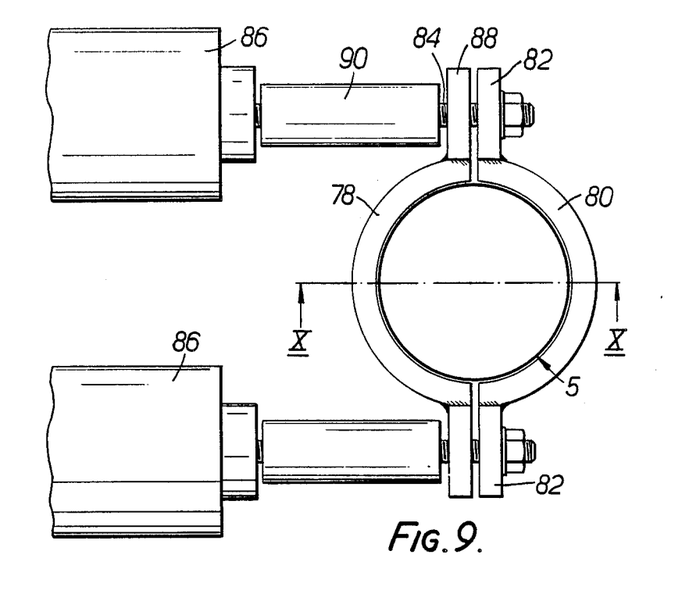
Figure 10:
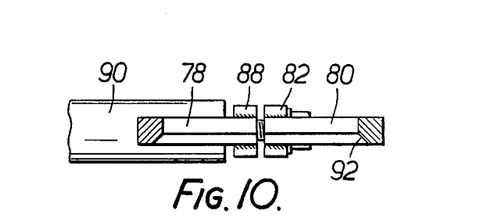

FIGS. 8 to 10 illustrate an alternative embodiment of clamping means. Instead of clamping means 52 comprising an inflatable resilient tire 54 and collar 64 gripping the PET tube ends, in this alternative embodiment the PET tube end portions which project beyond the mould wall 30 are grippable by a respective split-ring clamp 76. Each of the two clamps 76 comprises two half-rings, or yokes, one 78 being fixed relative to the mould 12 and the other yoke 80 being adapted to reciprocate toward and away from the fixed yoke. The movable yoke 80 is mounted, via a pair of integral ears 82 on a pair of piston rods 84, which are driven to reciprocate along their axes by means of respective fluid pressure cylinders, e.g. air cylinders 86. The piston rods 84 pass with clearance through ears on the fixed yoke 78, which is maintained at a fixed separation from the air cylinders by means of spacers 90 slipped over the piston rods 84.

In operation, the yokes 78,80 initially are apart from one another in their "open position" during loading of a PET tube 5 into the mould. Once the PET tube 5 has been inserted into the mould 12 and is in the position shown in FIG. 8, the clamps 76 are operted by actuating the air cylinders 86 to squeeze the movable yokes 80 towards their respective fixed yokes 78. The end portions of the PET tube 5 are thus urged by the clamps 76 against the mandrel within the tube 5.

As can be seen in FIGS. 8 and 10, the leading edges 92 of the yokes 78,80, i.e. that edge of the yoke first encountered by the mandrel carrying the PET tube 5 up into the mould 12, are chamfered to facilitate insertion of the mandrel and PET tube through the clamps 76 in their "open" position.

Various further alternative clamping means are envisaged, such as an iris ring clamping the PET tube 5 externally at either end, each iris ring comprising say six to eight separate leaves, each leaf having point contact with the PET tube.

Although the illustrated eabodiments show the mould and mandrel as having a circular cross-section, clearly it would be possible for the mould and mandrel to have other cross-sections, for instance polygonal, so long as the mould and mandrel were of complementary shape and so long as the mandrel and mould can still have axial relative movement.

I claim:

1. Apparatus for heat setting a preformed thermoplastic tubular article of a crystallisable polymer, which is open at both ends and which will be dimensionally stable up to a specific elevated temperature, comprising a mandrel, cooling means for cooling the mandrel to a temperature below the glass transition temperature of the tubular article, a mould having a cavity of complementary shape to that of the mandrel and surrounding the mandrel with a small clearance between the mandrel and mould, heating means for heating the mould to a temperature higher than said specific elevated temperature, clamping means for clamping each end of said article between the mandrel and mould for axially restraining said article and expansion means for elastically expanding the tubular article into contact with the mould.

2. Apparatus as claimed in claim 1, wherein the mandrel and mould are movable axially relative to one another.

3. Apparatus as claimed in claim 1 wherein the mandrel and mould are movable both axially and pivotally relative to one another to permit said preformed thermoplastic tubular article to be mounted on and removed from said mandrel.

4. Apparatus as claimed in claim 1, further comprising means for applying a vacuum to the mould cavity.

5. Apparatus as claimed in claim 4 wherein the expansion means comprises a means for applying a vacuum to the mould cavity.

6. Apparatus as claimed in claim 1, wherein the mandrel is hollow and has perforations in its surface, the expansion means comprising a conduit for supplying pressurised fluid to the interior of the mandrel.

7. Apparatus as claimed in claim 1, wherein the mould comprises a mould wall made of an air-permeable material.

8. Apparatus as claimed in claim 1, wherein the clamping means comprises, adjacent each end of the mandrel, an inflatable toroid of a resilient material, which cooperates when inflated, with respective surfaces on the mould to clamp said ends of the tubular article therebetween.

9. Apparatus as claimed in 1, wherein the clamping means comprises a pair of split-ring clamps, each having a fixed half-ring and a movable half-ring reciprocable relative to the fixed half-ring, wherein the ends of the tubular article can be squeezed between each clamp and the mandrel.

10. Apparatus as claimed in claim 1, wherein the mandrel is hollow and the cooling means comprises a helical conduit of a material of high thermal conductivity in thermal contact with the internal surface of the hollow mandrel, the conduit being served by cooling fluid supply and return means.

11. Apparatus as claimed in claim 1, wherein the heating means comprise band heaters wrapped around the external surface of the mould wall.

* * * * *